(12) United States Patent
Hardjono (10) Patent No.: US 6,785,809 B1
(45) Date of Patent: Aug. 31, 2004

(54) SERVER GROUP KEY FOR DISTRIBUTED GROUP KEY MANAGEMENT

(75) Inventor: Thomas P. Hardjono, Arlinton, MA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/330,464

(22) Filed: Jun. 11, 1999

Related U.S. Application Data (60) Provisional application No. 60/098,300, filed on Aug. 27, 1998.

(51) Int. Cl.[7] .............................. H04L 9/00; H04L 9/32
(52) U.S. Cl. ..................... 713/163; 713/155; 713/163; 713/201; 380/273; 380/277; 380/278
(58) Field of Search ................................ 713/163, 155, 713/201; 380/273, 277, 278, 279, 281

(56) References Cited

U.S. PATENT DOCUMENTS 5,748,736 A * 5/1998 Mittra ........................ 713/163

OTHER PUBLICATIONS

Wong, et al., *Secure Group Communications Using Key Graphs*, Department of Computer Sciences, Univ. of Texas, 1998, pp. 1–12.

Mittra, S., *Iolus: A Framework for Scalable Secure Multicasting*, Computer Science Department, Stanford Univ., 1997, pp. 1–12.

Harkins, D., *A Secure, Scalable Multicast Key Management Protocol (MKMP)*, Cisco Systems, 1997, 9 pgs.

Harney, et al., *Group Key Management Protocol (GKM)) Specification*, SPARTA, Inc., 1997, 22 pgs.

Ballardie, A., *Scalable Multicast Key Distribution*, University College London, 1996, 17 pgs.

* cited by examiner

*Primary Examiner*—Ayaz Sheikh
*Assistant Examiner*—A. Nobahar
(74) *Attorney, Agent, or Firm*—Blakely Sokoloff Taylor & Zafman LLP (57) ABSTRACT

A method and apparatus for distributed group key management for multicast security. According to one aspect of the invention, a common multicast group includes a number of key servers, as well as clients of those key servers that are currently members. In addition, there exists a server group key that is shared by the key servers and not by their clients to form a server multicast group within the common multicast group. A first of the key servers encrypts a message using the server group key. The message instructs the key servers regarding one or more keys used for encrypted communication between entities in the common multicast group. The encrypted message is then multicast to the rest of the key servers.

43 Claims, 3 Drawing Sheets

SERVER GROUP KEY FOR DISTRIBUTED GROUP KEY MANAGEMENT

CROSS-REFERENCE TO RELATED APPLICATIONS

This application claims the benefit of U.S. Provisional Application No. 60/098,300, filed Aug. 27, 1998. This application has the same specification as the U.S. Non-provisional Application titled "Distributed Group Key Management for Multicast Security," by Thomas Hardjono.

BACKGROUND OF THE INVENTION

1. Field of the Invention

The invention relates to the field of networks. More specifically, the invention relates to secure multicast communications.

2. Background Information

Many network applications are based upon the client-server paradigm and make use of unicast (point-to-point) packet and/or cell delivery. Many emerging applications (e.g., teleconference, real-time information services, pay per view, distributed interactive simulation, collaborative work, etc.), on the other hand, are based upon a group communications model. That is, they require packet and/or cell delivery from one or more authorized sender(s) to a large number of authorized receivers. Thus, multicast is an Internetwork service that provides efficient delivery of data from one or more sources to multiple recipients. It reduces sender transmission overhead, network bandwidth requirements, and the latency observed by receivers. This makes multicast an ideal technology for communication among a large group of principals.

Although multicast has been very successful at providing an efficient data delivery service to large groups, it has proven much more difficult to extend other features to multicast in a scalable manner. In particular, the need to secure electronic information has become increasingly apparent. Multicast, however, does not fit the point-to-point model of most network security protocols which were designed with unicast communications in mind.

The fundamental task of any network security protocol is to allow authorized principals to communicate securely over an insecure network where an attacker is assumed to be able to read, modify, or delete the raw communications. Typically, this is achieved by creating a security association between the authorized principals through authentication and key exchange. The security association defines a set of keying material shared only by the authorized principals that can then be used for a variety of security objectives such as authentication, confidentiality and integrity. While the concept of security associations is well understood in the context of unicast, the multipoint-to-multipoint model of multicast inherently changes the meaning and management of security associations.

Consider what happens under unicast. Two principals decide to communicate and employ a (unicast) network security protocol to setup a security association between them. This association then allows the pair to communicate securely. The security association is negotiated between the two principals, after which they employ the security methods (e.g. cryptographic algorithms) described in the negotiated security association.

In the case of multicast, there are multiple principles that are involved in the group communications, and thus the negotiations among them to achieve a common security association is a more complex problem.

A multicast security protocol must ensure that a principal is only allowed to participate during those periods when it is authorized to do so. The security association and thus the common group keying material (CGK in short) it defines must be changed on each join and leave. This change is to ensure that a joining entity is not able to access previously multicast data and a leaving entity is not able to continue to access data multicast after it leaves the group. The process of changing the common group key is commonly referred to as re-keying.

Note that we are not implying that the common keying material must be changed on each and every join or leave; that is a policy decision. However, a multicast security protocol must be prepared to change the common keying material on each and every join or leave to protect the integrity of the current group.

Specifically, when a member joins the group, the common group keying material (CGK) must be replaced and a new set of common group keying material (CGK') must be generated and distributed to the current group members as well as the joining member. There are a number of ways to do this. One simple method that works is to multicast CGK' to the current members using CGK to secure the transmission. Separately, the joining member can be apprised of the new key by unicasting CGK' to it using some unicast secure channel (e.g., the one used to request the join).

A member leaving the group creates a much more difficult problem. As with joins, a new set of common keying material must be generated, but in this case it must be distributed to the remaining members in the group and there is no efficient means to communicate CGK' to them alone because there is no secret which is shared with them alone (and not also including the leaving member). Indeed, CGK' is exactly this secret.

Given the chicken and egg situation, the keying material associated with each remaining member individually (i.e., unicast keys) must somehow be utilized to securely communicate CGK'. For example, using these unicast keys, a separate copy of CGK' could be sent to each one of the remaining members. The basic problem is that each of the members must be considered individually on each leave and this is extremely inefficient if the group is large or has a highly dynamic membership.

Therefore, changes in group membership involve "heavy-duty" tasks not only from the standpoint of authentication and approval of the join/leave request (which in and of itself may be time consuming requiring database accesses and cryptographic operations), but also form the distribution of new group keying material (especially on leaves).

These scalability problems are especially troublesome because many proposed applications of multicast have an ongoing need to maintain the integrity of the group for economic and other reasons. Of course, they also tend to have large group sizes and can often have highly dynamic group memberships. For example, a large class of multicast applications are information dissemination services (e.g., data, audio, and videocasts). These applications can have large and dynamic groups especially when combined with the idea of micro-commerce and a "buy-on-the-fly" model for gaining access to content. Multi-player games and other interactive simulations also may have a need to ensure fairness among participants as they join and leave. Finally, consider group key management for services normally accessed using unicast. For example, one existing company has a service that provides continuously updated airline flight information. This company charges for this service on a per-minute basis and so its group is large and constantly changing. Many other news and information retrieval services have a similar business model and thus exhibit similar usage patterns.

Various proposals have been made regarding techniques for re-keying, S. Mittra, "The Iolus Framework for Scalable Secure Multicasting," in Proceedings of ACM SIGCOMM'97, pp. 277–288, ACM 1997. However, such proposals have various drawbacks.

BRIEF SUMMARY OF THE INVENTION

A method and apparatus for distributed group key management for multicast security is described. According to one aspect of the invention, a common multicast group includes a number of key servers, as well as clients of those key servers that are currently members. In addition, there exists a server group key that is shared by the key servers and not by their clients to form a server multicast group within the common multicast group. A first of the key servers encrypts a message using the server group key. The message instructs the key servers regarding one or more keys used for encrypted communication between entities in the common multicast group. The encrypted message is then multicast to the rest of the key servers.

BRIEF DESCRIPTION OF THE DRAWINGS

The invention may best be understood by referring to the following description and accompanying drawings which are used to illustrate embodiments of the invention. In the drawings.

DETAILED DESCRIPTION OF THE INVENTION

A method and apparatus for distributed group key management for multicast security is described. In the following description, numerous specific details are set forth to provide a thorough understanding of the invention. However, it is understood that the invention may be practiced without these specific details. In other instances, well-known circuits, structures and techniques have not been shown in detail in order not to obscure the invention.

The techniques shown in the figures can be implemented using code and data stored and executed on computers. Such computers store and communicate (internally and with other computers over a network) code and data using machine readable media, such as magnetic disks; optical disks; random access memory; read only memory; flash memory devices; electrical, optical, acoustical or other form of propagated signals (e.g., carrier waves, infrared signals, digital signals, etc.); etc. Of course, one or more parts of the invention may be implemented using any combination of software, firmware, and/or hardware.

Figure 1:
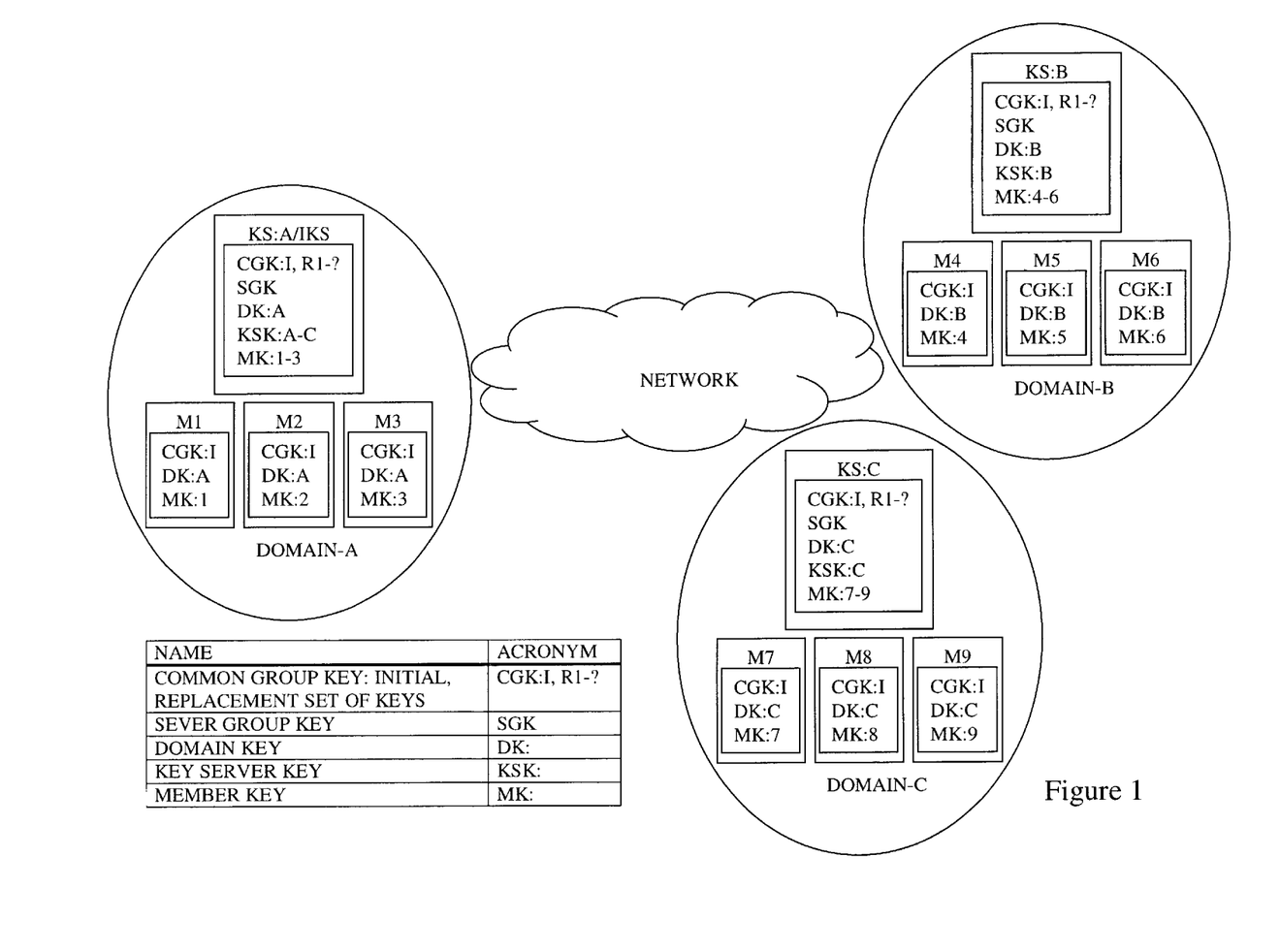
FIG. 1 is a block diagram illustrating an exemplary computer network (e.g., the Internet, an Intranet, etc.) according to one embodiment of the invention.

FIG. 1 is a block diagram illustrating an exemplary computer network (e.g., the Internet, an Intranet, etc.) according to one embodiment of the invention. According to FIG. 1, the network (or part thereof) is viewed as a collection of security domains, each being served by (at least) one Key Server (KS). A security domain is the set of network entities that run the protocol described herein. While not all inclusive, the following is an exemplary list of ways a security domain can be defined: 1) a collection of computer systems across the Internet; 2) all or a subset of the computer systems in an intranet; 3) all of a subset of computer systems in a wide and/or local area network; 4) all or a subset of computer systems in an enterprise; etc. A security domain may or may not have firewalls or other hardware/software protection at its boundaries.

The Key Server of each security domain services the clients within that security domain. The clients of the key servers can each be members of one or more multicast groups. There need not be an equal distribution of members within each domain. While one embodiment is described with reference to members of a multicast group being separated by security domains, alternative embodiments of the invention simply divide members of a multicast group into subgroups, where each subgroup has at least one key server.

The key server of the initiator (of the multicast group) controls the key generation and distribution of the Security Association (SA) and group-related keys. This key server will be called the Initiator Key Server (IKS).

In the example of FIG. 1 there are three (3) security domains containing a total of nine (9) multicast members M1, M2, . . . , M9. The distribution of the members are as follows: Domain-A has members M1, M2, M3; Domain-B has members M4, M5, M6; while Domain-C has members M7, M8, M9.

The key servers in the three domains of FIG. 1 are denoted as KS:A, KS:B and KS:C respectively. In addition, we assume that the initiator of the multicast group resides in Domain-A, hence the key server KS:A is the Initiator Key Server (IKS). Note that in practice, the IKS can be a different entity from the KS:A, both in the same Domain-A.

According to one aspect of the invention, two types of multicast groups are formed. The first is referred to as a common multicast group and includes all of the current key servers and members of that group. The second is referred to as a server multicast group and includes only the current key servers.

According to another aspect of the invention, a Security Association and a set of at least two (group-wide) common group keys are defined for a common multicast group. These values are selected by the IKS. The security association will be called SA:CG, while the common group-keys are denoted as CGK:I and CGK:R1-? (where R1-? indicates a set of one or more replacement keys). While different embodiments may include at number of keys in R1-?, the invention will be described with reference to an embodiment that includes a single replacement key (R).

The pair of common group keys (CGK:I, R) is initially distributed to all of the key servers, but only the initial common group key is provided to the members of the common multicast group. This initial common group key is used for multicast communications to the entire common multicast group (including key servers and members). Subsequently, when the need arises to re-key the current common group key (e.g., a specified time has passed, one or more members is joining and/or leaving, one or more key servers is joining and/or leaving, etc.), the replacement common group key previously distributed to the key servers is provided by those key servers to the current multicast members at that time in their subgroup/domain. As a result, there is no need await communications from the IKS to re-key the current common group key. In addition, the IKS can distribute a new set of common group keys to the key servers in the background and/or in parallel with the key servers distributing of the replacement common group key to the current common multicast group members.

Figure 2:
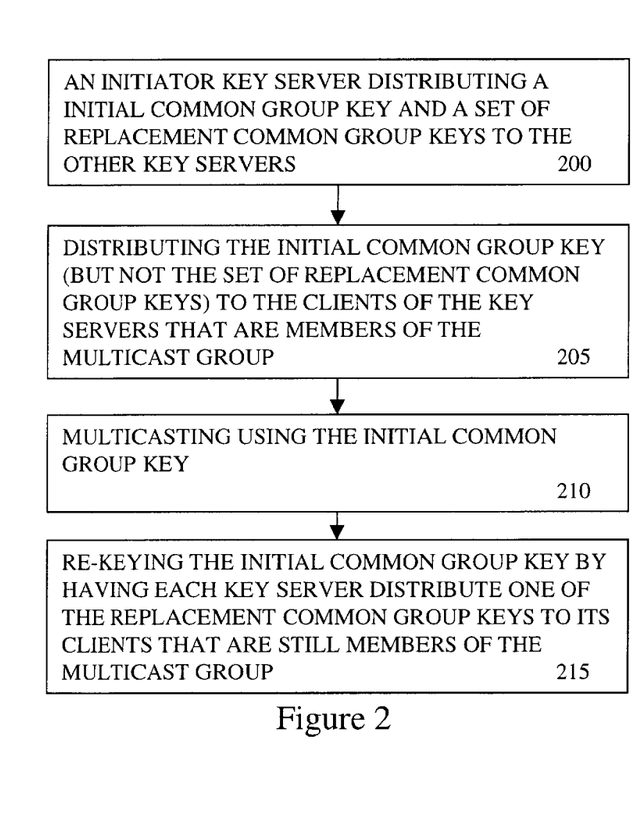
FIG. 2 is a flow diagram illustrating the pre-distribution of a replacement common group key and re-keying with the same according to one embodiment of the invention.

FIG. 2 is a flow diagram illustrating the pre-distribution of a replacement common group key and re-keying with the same according to one embodiment of the invention. In block 200, the IKS distributes the initial and replacement common group keys to the other key servers and control passes to block 205. With reference to the example of FIG. 1, the KS:A/IKS would distribute to KS:B-C the common group keys (CGK:I, R). Various exemplary techniques for performing block 200 are described later herein.

In block 205 the initial common group key, but not the replacement common group key, is distributed to the clients of the key servers that are currently members of the common multicast group. With reference to the example of FIG. 1, the initial common group key (CGK:I), but not the replacement common group key (CGK:R), is distributed to the members M:1–9. Various exemplary techniques for performing block 205 are also described later herein.

As shown in block 210, the initial common group key (CGK:I) is used as the current common group key (also referred to as the common multicast group key) for multi-casting messages to the members of the common multicast group. From block 210, control passes to block 215.

Responsive to a need to re-key the current common group key, in block 215 the replacement common group key (CGK:R) is distributed as the new current common group key to the clients of the key servers that are currently members of the multicast group at that time. With reference to the example of FIG. 1, the replacement common group key (CGK:R) is distributed to the members M:1–9 (assuming none of the members M1–9 left the multicast group). Various exemplary techniques for performing block 215 are also described later herein.

Exemplary Frameworks

According to one embodiment of the invention, each key server in a security domain shares a private-key with the IKS/KS:A (pair-wise). With reference to FIG. 1, these private-keys are denoted as KSK:A, KSK:B and KSK:C, respectively. Thus, key KSK:B is shared between KS:B and IKS/KS:A, while key KSK:C is shared between KS:C and IKS/KS:A. In this example, KSK:A is known only to the KS:A since it is the IKS.

In addition, each domain is associated with a domain key. With respect to FIG. 1, the domain keys are denoted as DK:A, DK:B, and DK:C and correspond to Domain-A, Domain-B, and Domain-C, respectively. In one embodiment of the invention, a domain key is known only by the key server of the domain and the members of that domain (see FIG. 1). In alternative embodiments of the invention, the domain keys are also know to the IKS; with respect to the exemplary network of FIG. 1, the following would be true for these alternative embodiments:

Domain key DK:A of Domain-A is known to the IKS (KS:A) and the members M1, M2, M3

Domain key DK:B of Domain-B is known to the IKS, the KS:B and the members M4, M5, M6; and Domain key DK:C of Domain-C is known to the IKS, the KS:C and the members M7, M8, M9

In addition, each member has a private key which it shares (pair-wise) with its domain key server. With reference to FIG. 1:

The key server KS:A (IKS) holds a copy of the private-keys MK:1, MK:2, MK:3 corresponding to the members M1, M2, M3 in Domain-A;

The key server KS:B holds a copy of the private-keys MK:4, MK:5, MK:6 corresponding to the members M4, M5, M6 in Domain-B; and The key server KS:C holds a copy of the private-keys MK:7, MK:8, MK:9 corresponding to the members M7, M8, M9 in Domain-C.

The private keys (e.g., KSK:A–C and MK:1–9) of the concerned entities are obtained and shared (e.g. security association and secure channel) with the appropriate other entities using any number of techniques, including those well known in the art. Once the private-keys of entities are correctly distributed, certain embodiments distribute the domain-keys DK:A, DK:B and DK:C through secure channels created by the previously distributed private keys.

As previously indicated, according to one aspect of the invention, all key servers involved in the common multicast group are a member of a separate multicast instance, called the server multicast group or server group (SG). The members of the server group are only the key servers within each domain. A separate key is designated for this server group, namely key SGK. The server group is run for the purpose of coordinating the key servers that are involved in the common multicast group (which uses the CGK and includes the key servers and members).

Figure 3:
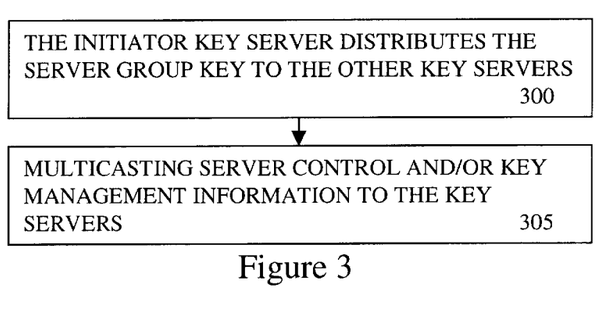
FIG. 3 is a flow diagram illustrating the distribution of a server group key and its security association according to one embodiment of the invention.

The key SGK and its Security Association (SA:SG) is determined by the IKS and delivered to each key server. FIG. 3 is a flow diagram illustrating the distribution of a server group key and its security association according to one embodiment of the invention. In block 300, the initiator key server distributes the server group key (and its security association) to the other key servers and control passes to block 305. For example, the initiator key server could distribute the group server key to each of the other key servers via the pair-wise secure channels created using the private-keys shared by the key servers and the IKS. With reference to FIG. 1, the pair (SA:SG, SGK) will be delivered by the initiator key server KS:A/IKS to key server KS:B using the secure channel created via key KSK:B. In one embodiment, each "secure channel" features data confidentiality and sender authentication. In block 305, server control and/or key management information is multicast to the key servers using the server group key.

In summary, two multicast group instances exist:

One common multicast group for the key servers and members to receive/send the common multicast traffic; and One server multicast group for only the key servers for control and management of the key servers and keys.

These two multicast instances are related through the fact that they involve the same set of key servers.

While one embodiment is described herein that includes a server multicast group, alternative embodiments do not include such a multicast group. For example, such alternative embodiments can rely on the secure channels provided by the server private keys (e.g., KSKs).

Exemplary Techniques for Common Group Key Distribution

Figure 4:
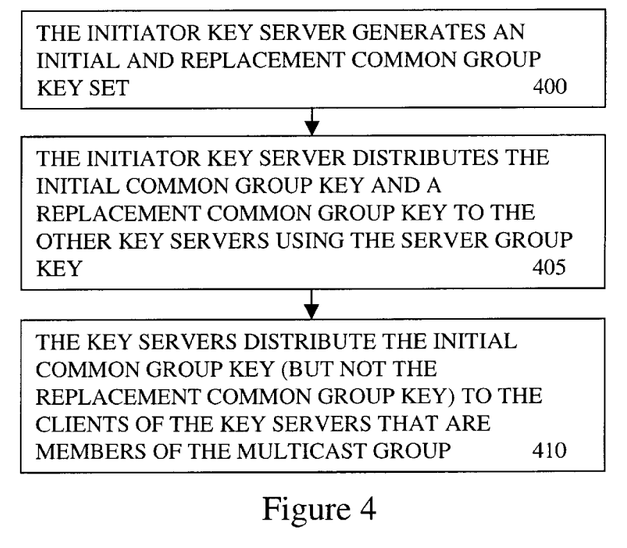
FIG. 4 is a flow diagram illustrating the initial distribution of an initial and replacement common group key set according to one embodiment of the invention.

FIG. 4 is a flow diagram illustrating the initial distribution of an initial and replacement common group key set according to one embodiment of the invention. Upon start-up of the scheme (block 400), the IKS generates the triplet (SA:CG, CGK:I, CGK:R) which is to be used to encipher traffic within the common multicast group. In block 405, the initiator key server multicasts the initial and replacement common group key set to the other key servers using the server group key and control passes to block 410. With reference to FIG. 1, the KS:A/IKS distributes the triplet (SA:CG, CGK:I, CGK:R) via secure multicast to the key servers KS:B-C using the server group key. In this example, where the IKS and KS:A are the same entities, KS:A already has the triplet. However, if they happen to be different entities in the same Domain-A, then the IKS must provide the triplet to KS:A through a secure channel.

In one embodiment, the security association SA:CG applies to both of the common group keys in the set (they feature the same characteristics). The keys CGK:I and CGK:R are also respectively referred to as the primary and secondary group keys. In an alternative embodiment, the triplet is delivered by the IKS to each key server via a secure channel (e.g., unicast) using the server keys (as opposed to the server group key).

In block 410 the key servers distribute the initial common group key (but not the replacement common group key) to the clients of the key servers that are currently members of the multicast group. For example, a key server obtains the triplet (SA:CG, CGK:I, CGK:R) and separates the triplet into two pieces, namely (SA:CG, CGK:I) and (SA:CG, CGK:R), duplicating the value of SA:CG. The key server then initially delivers only the pair (SA:CG, CGK:I) to the current members in its own domain. In one embodiment, the key server uses the member (private) keys to create secure channels for delivering (SA:CG, CGK:I) to its members. Thus, for example, the key server KS:B will deliver (SA:CG, CGK:I) via secure channels (e.g., encrypted and sender-authentic) to the members M4, M5, M6 in Domain-B using their respective keys MK:4, MK:5, MK:6. In an alternative embodiment in which domain keys are available, the key server uses its domain key to create a secure multicast to distribute (SA:CG, CGK:I) to its members. For example, the key server KS:B will deliver (SA:CG, CGK:I) via a secure multicast to the members M4, M5, M6 in Domain-B using DK:B.

Once all members receive (SA:CG, CGK:I) they can send/receive multicast traffic to/from the common multicast group encrypted using the group key CGK:I. The second piece, namely and (SA:CG, CGK:R), comes into use when a re-keying needs to be carried-out throughout the whole common multicast group.

While one embodiment is described in which CGK:I is distributed to members through the key servers, alternative embodiment distribute CGK:I in different ways. For example, in one alternative embodiment: 1) the IKS delivers (SA:CG, CGK:I) to key servers and members using the domain keys; and 2) the IKS delivers (CGK:R) to the key servers using server (private) keys or the server group key (SGK). Such an alternative embodiment may also chose not to distribute common group keys in pairs, but to distribute a single new replacement key to the key servers each time the prior replacement key is distributed by the key servers to their members.

Exemplary Techniques for Re-keying

When a re-keying occurs, each server will issue the next key CGK:R to their respective members in the form of the pair (SA:CG, CGK:R). In a domain where the membership changed (e.g., member join/leave) this pair (SA:CG, CGK:R) is delivered via secure unicast to each remaining member (under their private-keys). In the other domains (where the membership did not change), the pair (SA:CG, CGK:R) can be delivered encrypted under the domain key of that domain with the result being multicasted to the scope of that domain. In this manner, this group key management scheme with regard to the re-keying the current common group key has improved scalability.

Member Leaving

In the current scheme, the process of re-keying is illustrated by considering the case where member M9 leaves the group while the initial common group key is the current common group key. When member M9 in Domain-C leaves the common multicast group, the current common group key CGK:I must be replaced with the replacement common group key CGK:R which is already in the possession of each key server.

In one embodiment, once a replacement common group key is in use, all the key servers obtain the next triplet (SA:CG', CGK:I', CGK:R') from the IKS. This process is done in the background through a secure channel (e.g., pair-wise between a key server and the IKS via the private-key of the key server, multicast to the server group encrypted under key SGK, etc.).

In this way, latency is reduced since each key server in each domain can immediately re-key its domain in parallel, delivering the new (secondary) replacement common group key to its members. Specifically, each key server would always have ready the next common group key to be employed when re-keying occurs, either in the form of a replacement common group key or a new triplet (SA:CG', CGK:I', CGK:R').

Figure 5:
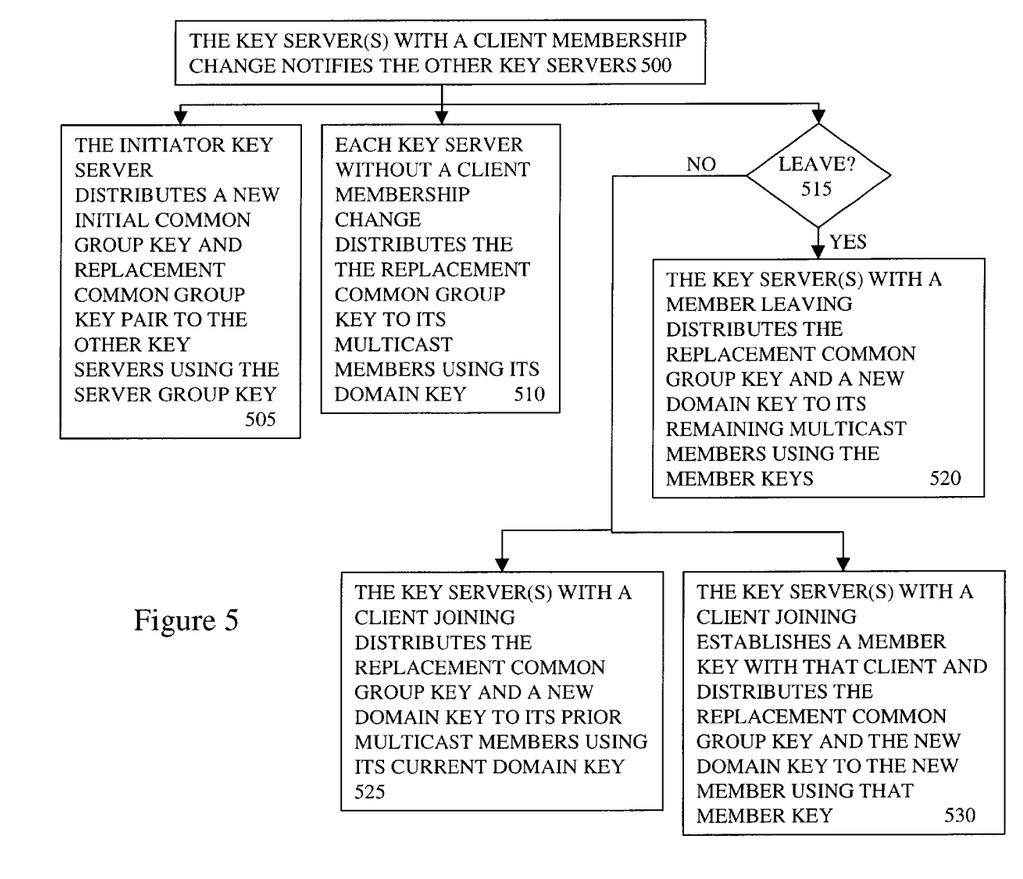
FIG. 5 is a flow diagram illustrating the re-keying on a leave and/or join of a member(s) to the common multicast group according to one embodiment of the invention.

FIG. 5 is a flow diagram illustrating the re-keying on a leave and/or join of a member(s) to the common multicast group according to one embodiment of the invention. On either a leave or a join, the key server(s) with a client membership change notify the other key servers (block 500). Using the above example in which the member M9 in Domain-C leaves the multicast group, the key server KS:C in Domain-C notifies all the other key servers and the IKS of this event. Although different techniques can be used, this can be done using either of the following two exemplary ways:

The key server KS:C in Domain-C can notify the other key servers through the server multicast group (whose membership consists only of key servers and the IKS) using key SGK to achieve confidentiality and authentication.

Alternatively, the key server KS:C in Domain-C can simply notify the IKS through a secure-channel under private-key KSK:C (which it shares with the IKS), and then the IKS can forward the notice to the other key servers (e.g., via pair-wise secure unicast using the private key of each respective key server, via multicast using the key SGK).

Control passes from block 500 to each of blocks 505, 510 and 515 to indicate that each of these paths are independent of the other, and therefore may be performed at different times and/or all or partially in parallel. In block 505, the initiator key server multicasts a new initial and replacement common group key set to the other key servers using the server group key. As described above, alternative embodiments can use other distribution techniques (e.g., the IKS can deliver the new triplet (SA:CG', CGK:I', CGK:R') to each key server under the private key of each respective key server).

As shown in block 510, each key server without a client membership change distributes the replacement common group key to its multicast members using its domain key. With reference to the current example where M9 is leaving, the KS:A uses the domain-key DK:A of Domain-A to encipher the replacement common group key and its security association (SA:CG, CGK:R), and multicasts the enciphered result to the whole group or to a limited-scope multicast within Domain-A. The leaving member M9 will not be able to decipher the message because the leaving member M9 will not have a copy of the key DK:A. In particular, in the described embodiment, only members in Domain-A have a copy of the key DK:A. In alternative embodiments, the member (private) keys can be used to distribute the replacement common group key to the current members of the common multicast group in the domain.

In block 515, it is determined if the membership change is a leave. If the membership is a leave, control passes to block 520. Otherwise, the membership change is a join and control passes to both of blocks 525 and 530. In the above example, the membership change is a leave (member M9 is leaving) and control passes to block 520.

In block 520, the key server(s) with a member leaving distribute the replacement common group key and a new domain key to its remaining members using the member keys. With reference to FIG. 1, the key server KS:C delivers the replacement common group key (SA:CG, CGK:R) and a new domain-key DK:C' to each remaining member in Domain-C via secure unicast (or some other secure channel). Specifically, the key server KS:C generates a new domain key DK:C' for Domain-C, and then enciphers the new domain-key DK:C' and the new common group key (SA:CG, CGK:R) using the private key of the remaining members (e.g., the key server KS:C encrypts the values ((SA:CG, CGK:R), DK:C') under key MK:7 and delivers the result unicast to member M7, which is decipherable by M7). In embodiment in which the IKS stores the domain keys for the different domains, the key server KS:C also provides a copy of the new domain-key DK:C' to the IKS by encrypting under the private-key KSK:C (which KS:C shares with IKS) and sending the result unicast to the IKS. The IKS has a copy of KSK:C and hence it is able to decipher the transmission.

Note that block 505 can be done in the background and hence does not affect the members of the multicast group. Note also that paths starting with blocks 510 and 515 can be done simultaneously within each domain respectively, thus reducing the overall latency due to the key-switch. This is true since each member only has to obtain the replacement common group key from its local key server (not from the IKS, which may be remote).

When the need again arises to re-key the current common group get (e.g., the replacement common group key expires, another membership change occurs, etc.), the next common group key (namely CGK:I') becomes the new common group key. Hence the pattern repeats. While one embodiment is described in which a new triplet is distributed when CGK:I is replaced with CGK:R, alternative embodiments can use different techniques. For example, an alternative embodiment could wait to distribute CGK:I' or CGK:R' until the need arises to re-key while the replacement common group key CGK:R is in use. As another example, alternative embodiments could distribute only a single replacement key (as opposed to an initial and replacement key set). Such embodiments require the IKS deliver a new replacement key on every re-key, as opposed to on every other re-key (every re-key in which the last replacement key in an initial and replacement key set is distributed to the current members).

Member Joining

By way of example, assume that member M10 in Domain-C joins the multicast group, having established a security association and private-key MK:10 with the key-sever KS:C in Domain-C.

In block 525, the key server(s) with a client joining multicasts the replacement common group key and a new domain key to its prior multicast members using its current domain key. In the above example in which member M10 joins Domain-C, the key server KS:C delivers the replacement common group key (SA:CG, CGK:R) and a new domain-key DK:C' to each existing member via secure multicast. Specifically, the key server KS:C generates a new domain key DK:C' for Domain-C, enciphers the new domain-key DK:C' and the new common group key (SA:CG, CGK:R) using the current domain-key DK:C, and multicasts the result to only the domain (limited scope multicasting) or to the entire group. Only members in Domain-C will be able to decipher it. As described above, alternative embodiments could use the member (private) keys rather then the current domain key. Additionally, in embodiments in which IKS stores the domain keys of the different domains, the key server KS:C provides a copy of the new domain-key DK:C' to the IKS by encrypting under the private-key KSK:C (which KS:C shares with IKS) and sending the result unicast to the IKS. The IKS has a copy of KSK:C and hence it is able to decipher the transmission.

As shown in block 530, the key server(s) with a client joining establish a member key with that client and distribute the replacement common group key and the new domain key to the new member using that member key. To continue the above example, member M10 is allowed to join by way of the key server KS:C providing member M10 with a copy of the values ((SA:CG, CGK:R), DK:C') via a secure channel (using the private-key MK:10 which is shared between the KS:C and M10).

Alternative Embodiments

The invention has been described in which a new key is sent to different members encrypted with those members' keys. However, this does not mean that each such transmission is a separate unicast. Rather, instead of sending separate unicast messages to such member, the sending party can simply multicast one message containing n copies of new key (assuming n members need the new key) each encrypted with a different member's key. In this way, a more efficient single message of size O (n) can replace O (n) separate messages.

The need for group key management is not limited to multicast applications. As an example, consider a database that can be queried (using unicast) by a (changing) set of principles that logon and logoff the database. In effect, the current set of authorized principals constitutes a group. Instead of verifying the authorization for each principal separately on a per-query basis, the authorization for any query could be verified based on the possession of a common group key. The advantage of using a common group key is that it obviates the need to separately retrieve and apply the principal's keying material on each query. The invention can also be used to build protocols that provide a group key management service to unicast applications.

Given a set of security objectives it is usually possible to provide them using multiple cryptographic algorithms and protocols. The choice of a given algorithm or protocol is dictated by factors such as security threats, performance concerns, and export limitations. Thus, the framework may assume the availability of standard cryptographic algorithms and protocols, but the invention is not limited to the use of any specific algorithms or protocols.

To be as widely applicable as possible, the framework should not make any discretionary assumptions concerning the services offered by the network or the communications protocol. It should be possible to implement the framework on any network that supports best-effort unicast and multicast services. (Of course, it should be noted that multicast can be simulated using either unicast or broadcast, albeit with a loss of efficiency.) It should be note that any network that supports the basic communications services mentioned above can be used to implement the invention.

While embodiments of the invention have been described in which the security association for a set of keys is always distributed with those keys, alternative embodiments of the invention do not always distribute such security associations with the keys. Rather, the security associations are agreed to ahead of time (e.g., have been previously) and are used for all keys until a new security association is delivered (e.g., with a new key). For example, in the above description the security association for an initial and replacement common group key set is sent to the members when sending either of the initial and replacement keys. However, alternative embodiments could distribute the security association for the key set with only the initial common group key. Other embodiments could periodically include a new secretary association with either of the common group keys.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method comprising:
   encrypting a message using a server group key, by a first of a plurality of key servers having clients that are currently members, the server group key being shared by the plurality of key servers and not by the clients to form a server multicast group within a common multicast group, the common multicast group including the clients that are currently members and sharing a current common group key, said message instructing the plurality of key servers regarding one or more keys used for encrypted communication between entities in the common multicast group;
   multicasting the encrypted message to rest of the plurality of key servers;
   receiving the current common group key and a replacement common group key distributed by the first of the key servers using the server group key;
   distributing only the current common group key to current members in a domain using one of a member private key and a domain key; and
   multicasting messages within the common multicast group using the current common group key.

2. The method of claim 1, wherein said encrypted message instructs the rest of the plurality of key servers to re-key the current common group key currently being used for multicasting the messages to the common multicast group.

3. The method of claim 1, wherein said message encrypted instructs the rest of the plurality of key servers to provide to the clients that are currently members of the common multicast group a new common group key to be used for multicasting messages to the common multicast group, the new common group key replacing the current common group key.

4. The method of claim 1, wherein said encrypted message instructs the rest of the plurality of key servers regarding a change in membership of the common multicast group.

5. The method of claim 1 wherein receiving comprises:
   decrypting the multicasted encrypted message using the server group key by a second of said plurality of key servers.

6. The method of claim 1, wherein said distributing comprises distributing the domain key to be shared with the clients of said second key server that are currently members of said common multicast group.

7. The method of claim 5, wherein said distributing comprises:
   encrypting the current common group key using the domain key shared by the clients of said second key server that are currently members of said common multicast group; and
   said second key server multicasting said encrypted current common group key.

8. The method of claim 7, wherein said distributing further comprises encrypting and multicasting a new domain key with said current common group key, said new domain key to be shared with the clients of said second key server that are currently members of said common multicast group.

9. The method of claim 7, wherein said distributing further comprises:
   encrypting the common group key using a member key shared by a client of said second key server that is joining said common multicast group; and
   multicasting said current common group key encrypted with said member key to said client by said second key server.

10. The method of claim 5, wherein said distributing comprises:
    separately encrypting, for each client of said second key server that is currently a member of said common multicast group, the current common group key using a private key shared by that client and the second key server; and
    transmitting said separate encryptions of the common group key to the clients that are currently members of said multicast group by said second key server.

11. The method of claim 10, wherein said distributing further comprises encrypting and transmitting a domain key with said current common group key, said domain key to be shared with the clients of said second key server that are currently members of said common multicast group.

12. A computer network comprising:
    a plurality of key servers and clients of the key servers sharing a current common group key for encrypting multicast communications to a common multicast group; wherein
    said plurality of key servers and none of said clients shares a server group key for encrypting multicast communications regarding keys used for encrypted communication between entities in the common multicast group, and
    a first of the key servers to receive the current common group key and a replacement group key distributed by an initiator key server using a server group key, the first key server distributing only the current common group key to current members in a domain using one of a member private key and a domain key, and multicasting messages within the common multicast group using the current common group key.

13. The computer network of claim 12, wherein each of the plurality of key servers in a group shares a different member key with each of the clients in the group.

14. The computer network of claim 12, wherein each of the plurality of key servers shares a different subgroup key with the certain clients of that key server, each of said subgroup keys for encrypting multicast communications.

15. The computer network of claim 12, wherein one of the key servers acts as an initiator key server, said initiator key server generating the common group keys.

16. The computer network of claim 15, wherein each of the plurality of key servers shares a different key server key with the initiator key server for encrypted communications among the key servers.

17. A machine-readable media having stored thereon one or more instructions that when executed cause a machine to perform operations comprising:
   encrypting a message using a server group key by a first of a plurality of key servers having clients that are currently members, the server group key being shared by the plurality of key servers and not by the clients to form a server multicast group within a common multicast group, the common multicast group including the clients that are currently members and sharing a current common group key, said message instructing the plurality of key servers regarding one or more keys used for encrypted communication between entities in the common multicast group;
   multicasting the encrypted message to rest of the plurality of key servers;
   receiving the current common group key and a replacement common group key distributed by the first of the key servers key server using the server group key;
   distributing only the current common group key to current members in a domain using one of a member private key and a domain key; and
   multicasting messages within the common multicast group using the current common group key.

18. The machine-readable media of claim 17, wherein said encrypted message instructs the rest of the plurality of key servers to re-key the current common group key currently being used for multicasting messages to the common multicast group.

19. The machine-readable media of claim 17, wherein said encrypted message instructs the rest of the plurality of key servers to provide to the clients that are currently members of the common multicast group a new common group key to be used for multicasting messages to the common multicast group, the new common group key replacing the current common group key.

20. The machine-readable media of claim 17, wherein said encrypted message instructs the rest of the plurality of key servers regarding a change in membership of the common multicast group.

21. The machine-readable media of claim 17 wherein the one or more instructions causing the machine to perform receiving comprises one or more sequences of instructions that, when executed, cause the machine to perform operations comprising:
   decrypting the multicasted encrypted message using the server group key by a second key server.

22. The machine-readable media of claim 21, wherein the one or more of instructions causing the machine to perform distributing comprises one or more instructions that, when executed, cause the machine to perform operations comprising distributing a domain key to be shared with the clients of said second key server that are currently members of said common multicast group.

23. The machine-readable media of claim 21, wherein the one or more of instructions causing the machine to perform distributing comprises one or more instructions that, when executed, cause the machine to perform operations comprising:
   encrypting the current common group key using a domain key shared by the clients of said second key server that are currently members of said common multicast group; and
   multicasting said encrypted current common group key by said second key server.

24. The machine-readable media of claim 23, wherein the one or more of instructions causing the machine to perform distributing further comprises one or more instructions that, when executed, cause the machine to perform operations comprising encrypting and multicasting a new domain key with said current common group key, said new domain key to be shared with the clients of said second key server that are currently members of said common multicast group.

25. The machine-readable media of claim 23, wherein the one or more of instructions causing the machine to perform distributing further comprises one or more instructions that, when executed, cause the machine to perform operations comprising:
   encrypting the current common group key using a member key shared by a client of said second key server that is joining said common multicast group; and
   multicasting said common group key encrypted with said member key to said client by said second key server.

26. The machine-readable media of claim 21, wherein the one or more of instructions causing the machine to perform distributing comprises one or more instructions that, when executed, cause the machine to perform operations comprising:
   separately encrypting, for each client of said second key server that is currently a member of said common multicast group, the current common group key using a private key shared by that client and the second key server; and
   transmitting said separate encrypted current common group key to its clients that are currently members of said multicast group by said second key server.

27. The machine-readable media of claim 26, wherein the one or more of instructions causing the machine to perform distributing further comprises one or more instructions that, when executed, cause the machine to perform operations comprising encrypting and transmitting a domain key with said current common group key, said domain key to be shared with the clients of said second key server that are currently members of said common multicast group.

28. A method comprising:
   receiving a current common group key and a replacement common group key distributed by a key server using a server group key;
   distributing only the current common group key to current members in a domain using one of a member private key and a domain key; and
   multicasting messages within a common multicast group using the current common group key.

29. The method of claim 28 further comprising:
   re-keying the current common group key when the current common group key expires or when membership of the current members changes.

30. The method of claim 29 wherein re-keying comprises:
re-keying the current common group key by the replacement common group key.

31. The method of claim 30 further comprising:
receiving a next replacement common group key when the replacement common group key is being used.

32. The method of claim 28 wherein receiving comprises:
decrypting a multicast message by a first of a plurality of key servers having clients, the multicast message being received over a network and encrypted using the server group key, said server group key being shared by said plurality of key servers and not the clients to provide a server multicast group within the common multicast group that includes the plurality of key servers and the clients that are currently members, the common multicast group sharing the current common group key.

33. The method of claim 32, wherein said message indicates a change in membership of the common multicast group.

34. An apparatus comprising:
a key server to receive a current common group key and a replacement group key distributed by an initiator key server using a server group key, the key server distributing only the current common group key to current members in a domain using one of a member private key and a domain key, and multicasting messages within a common multicast group using the current common group key.

35. The apparatus of claim 34 wherein the key server re-keys the current common group key when the current common group key expires or when membership of the current members changes.

36. The apparatus of claim 35 wherein the key server re-keys the current common group key by the replacement common group key.

37. The apparatus of claim 36 wherein the key server receives a next replacement common group key when the replacement common group key is being used.

38. A machine-readable media having stored thereon one or more sequences of instructions that when executed cause a machine to perform operations comprising:
receiving a current common group key and a replacement common group key distributed by a key server using a server group key;
distributing only the current common group key to current members in a domain using one of a member private key and a domain key; and
multicasting messages within a common multicast group using the current common group key.

39. The machine-readable media of claim 38 further having stored thereon one or more instructions that when executed cause the machine to perform operations comprising:
re-keying the current common group key when the current common group key expires or when membership of the current members changes.

40. The machine-readable media of claim 39 wherein the one or more instructions causing the machine to perform re-keying comprises one or more instructions that, when executed, cause the machine to perform operations comprising:
re-keying the current common group key by the replacement common group key.

41. The machine-readable media of claim 40 further having stored thereon one or more instructions that when executed cause the machine to perform operations comprising:
receiving a next replacement common group key when the replacement common group key is being used.

42. The machine-readable media of claim 38 wherein the one or more instructions causing the machine to perform receiving comprises one or more instructions that when executed cause a machine to perform operations comprising:
decrypting a multicast message, by a first of a plurality of key servers having clients, the multicast message being received over a network and encrypted using a server group key, said server group key being shared by said plurality of key servers and not the clients to provide a server multicast group within a common multicast group that includes the plurality of key servers and their clients that are currently members, the common multicast group sharing the current common group key.

43. The machine-readable media of claim 42, wherein said message indicates a change in membership of the common multicast group.

* * * * *